United States Patent
Lillevold (10) Patent No.: US 7,627,039 B2
(45) Date of Patent: Dec. 1, 2009

(54) PARALLEL VIDEO DECODING

(75) Inventor: Karl O. Lillevold, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 940 days.

(21) Appl. No.: 10/656,537

(22) Filed: Sep. 5, 2003

(65) Prior Publication Data

US 2005/0053157 A1    Mar. 10, 2005

(51) Int. Cl.
    *H04N 7/12* (2006.01)
    *H04N 7/36* (2006.01)
(52) U.S. Cl. .................... 375/240.25; 348/416
(58) Field of Classification Search ............... 348/461, 348/474, 460, 467, 571, 723, 725, 419.1, 348/423, 425.2, 712, 384, 716, 714, 419, 348/423.1, 718, 416; 382/234, 236, 237, 382/238, 239, 240, 241, 242, 243; 375/240.24, 375/240, 240.25, 240.29, 240.01, 240.23; 386/27, 33, 34, 35, 37, 40, 64, 65, 68, 46, 386/101, 109
See application file for complete search history.

(56) References Cited

U.S. PATENT DOCUMENTS

| | | |
|---|---|---|
| 5,519,438 A | 5/1996 | Elliott et al. |
| 5,784,119 A | 7/1998 | Noda et al. |
| 5,870,087 A | 2/1999 | Chau |
| 5,978,509 A | 11/1999 | Nachtergaele et al. |
| 6,008,849 A | 12/1999 | Frencken |
| 6,141,383 A | 10/2000 | Yu |
| 6,198,773 B1 | 3/2001 | Gill et al. |
| 6,259,740 B1 | 7/2001 | Lyu |
| 6,266,091 B1 | 7/2001 | Saha et al. |
| 6,275,532 B1 | 8/2001 | Hibi et al. |
| 6,295,321 B1 | 9/2001 | Lyu |
| 6,425,054 B1 * | 7/2002 | Nguyen ............ 711/117 |
| 6,469,743 B1 | 10/2002 | Cheney et al. |
| 6,487,248 B1 | 11/2002 | Lim et al. |
| 6,525,783 B1 | 2/2003 | Kim et al. |
| 6,529,244 B1 | 3/2003 | Hrusecky |
| 6,587,057 B2 | 7/2003 | Scheuermann |
| 6,597,741 B1 | 7/2003 | Miyazaki |
| 6,654,500 B1 | 11/2003 | Lyu |
| 6,658,056 B1 | 12/2003 | Duruoz et al. |
| 6,661,422 B1 | 12/2003 | Valmiki et al. |
| 6,704,361 B2 * | 3/2004 | Bublil et al. ............ 375/240.23 |
| 2003/0189982 A1 * | 10/2003 | MacInnis ............ 375/240.24 |
| 2003/0219072 A1 * | 11/2003 | MacInnis et al. ....... 375/240.25 |
| 2004/0057522 A1 * | 3/2004 | Wu et al. ............ 375/240.26 |
| 2004/0066852 A1 * | 4/2004 | MacInnis ............ 375/240.25 |

* cited by examiner

*Primary Examiner*—Behrooz Senfi
(74) *Attorney, Agent, or Firm*—Axios Law; Adam L. K. Philipp (57) ABSTRACT

A video receiver/renderer is provided with a decoder equipped with hardware and/or software components adapted to decode at least two slices of a video in parallel, in part. In various embodiments, the decoder is constituted with multiple decoding units or decoding instructions that can be executed in multiple threads. A decoding unit/thread is advantageously equipped to determine whether a slice has decoding dependency, if so, whether the portion(s) of the video on which a slice's decoding is dependent has/have been decoded. If the result of the latter determination is negative, the decoding unit suspends itself until the determination result is affirmative. If the slice has no decoding dependency or the determination result is affirmative, the decoding unit proceeds to decode the slice.

17 Claims, 8 Drawing Sheets

```
slice_header() {                                    ~402
    parameter_set_id                                ~404
    first_mb_in_slice                               ~406
    if( coding_type() == P || coding_type() == B ) {
        num_ref_pic_active_fwd_minus1               ~408
        if( coding_type() == B )
            num_ref_pic_active_bwd_minus1           ~410
    }
    Others .....                                    ~414
    if( entropy_coding_mode == 1 )                  ~412
        num_mbs_in_slice
}
```

PARALLEL VIDEO DECODING

BACKGROUND OF THE INVENTION

Advances in microprocessor and video related technologies have led to wide spread deployment and adoption of numerous types of video devices. Examples of such video devices include but are not limited to digital camcorders, digital versatile disk (DVD) players, video enabled laptop and desktop computing devices as well as servers, and so forth.

Advances in networking, telecommunication, satellite and other related technologies have also led to increase in on demand and/or real time online delivery of video, including delivery over public networks, such as the Internet.

Whether videos are delivered offline (e.g. from a DVD player) or online (e.g. from a video server), high quality video inherently requires a high volume of data. Thus, video delivery and rendering often involve encoding and decoding to reduce the amount of data to be stored, retrieved and/or transmitted.

Encoding/decoding of a video often involves processing the video as a stream of pictures. Each picture may be a field or a frame (typically consisting of two interleaved fields), and decomposed into a number of slices of macroblocks. Each slice may comprise an integer number of macroblocks, typically in raster scan order. Each macroblock in turn may comprise a number of blocks of pixels.

Further, encoding of the various fields/frames of macroblocks often involves predictive encoding that backward and/or forward references other fields/frames. Resultantly, decoding of video has thus far been performed serially.

Serial decoding is inherently not very efficient. Accordingly, improvement is desired.

BRIEF DESCRIPTION OF THE DRAWINGS

Embodiments of the present invention will be described by way of the accompanying drawings in which like references denote similar elements, and in which.

DETAILED DESCRIPTION OF EMBODIMENTS OF THE INVENTION

Embodiments of the present invention include but are not limited to a decoder, components and systems incorporated with the decoder.

In the following description, various aspects of embodiments the present invention will be described. However, it will be apparent to those skilled in the art other embodiments may be practiced with only some aspects of the embodiments. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure these embodiments.

Terminology

Parts of the description will be presented in video encoding and decoding terms, such as picture, frame, field, macroblock, block and so forth, consistent with the manner commonly employed by those skilled in the art to convey the substance of their work to others skilled in the art. These terms are to be accorded their plain meanings as understood by those ordinarily skilled in the art. In particular, in a video device having at least some aspects of the present invention implemented in software, various quantities nevertheless take the form of electrical, magnetic, or optical signals capable of being stored, transferred, combined, and otherwise manipulated through electrical and/or optical components of a processor, and its subsystems.

In various video encoding/decoding standards, encodings are organized in accordance with certain syntactical rules, thus they may also be referred to as "syntax elements".

Section Headings, Order of Descriptions and Embodiments

Section headings are merely employed to improve readability, and they are not to be construed to restrict or narrow the present invention.

Various operations will be described as multiple discrete operations in turn, in a manner that is helpful in understanding the embodiments being described, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Overview

Figure 1:
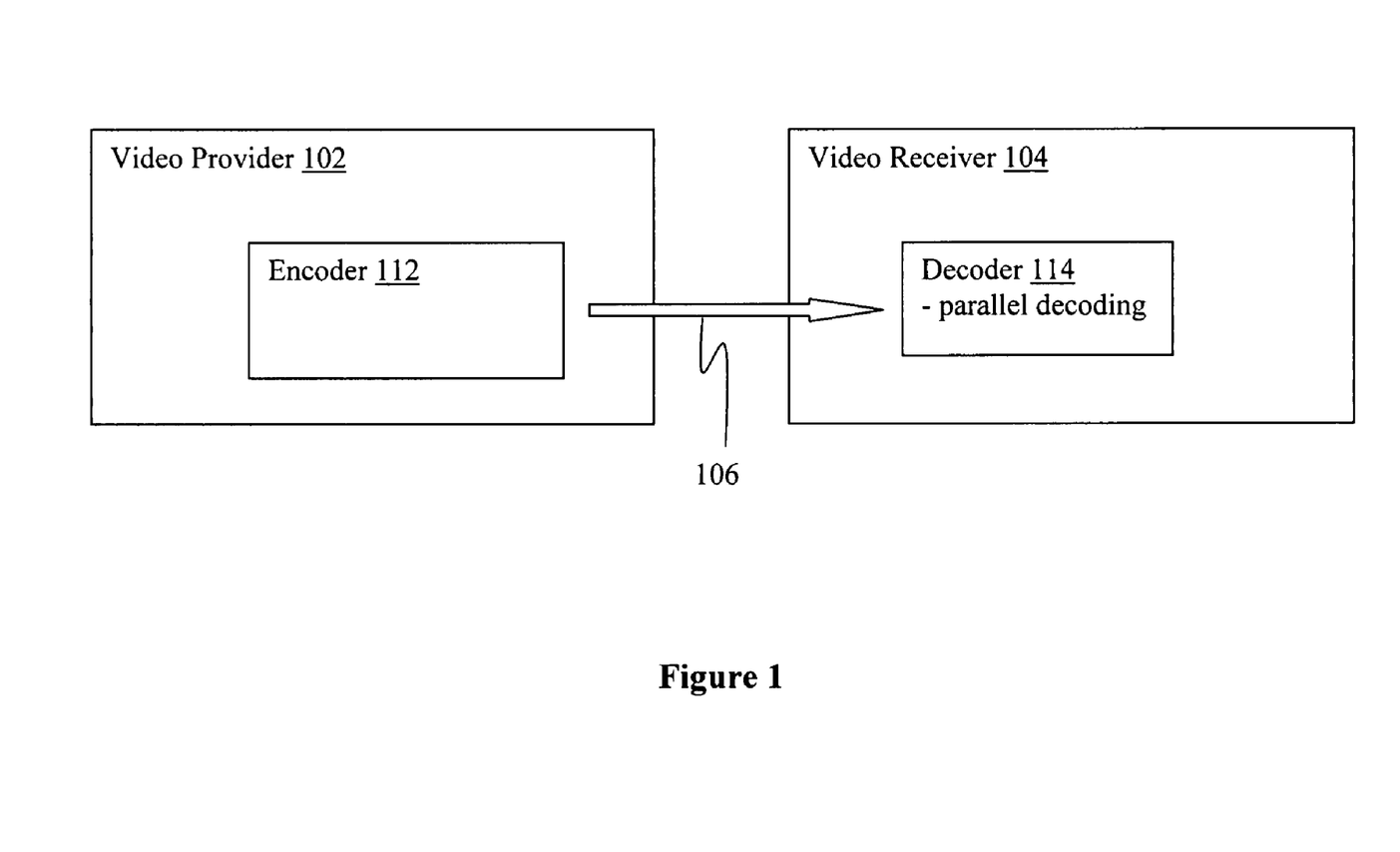
FIG. 1 illustrates a system having a video sender device and a video receiver device incorporated with encoding/decoding teachings of the present invention, in accordance with one embodiment.

FIG. 1 illustrates an overview of a system incorporated with encoding/decoding teachings of the present invention, in accordance with one embodiment. As illustrated, for the embodiment, example system 100 includes video sender 102 and video receiver 104 communicatively coupled to each other as shown. Video sender 102 includes in particular encoder 112, while video receiver 104 includes in particular decoder 114.

Video sender 102 provides encoded video to video receiver 104, using encoder 112 to encode the video. Video receiver 104 receives the encoded video, decodes the video using decoder 114, and renders the decoded video for consumption by one or more users of video receiver 104. Accordingly, video receiver 104 may also be referred to as a video renderer. For the purpose of the present application, the two terms may be considered interchangeable, unless the context clearly indicates to the contrary.

Further, decoder 114 advantageously includes hardware and/or software components adapted to be able to decode at least two slices of an encoded video in parallel, in part, to be described more fully below. For the purpose of the present application, as described earlier, a slice of a video is an integer number of macroblocks of a video. A video includes a number of pictures, each including a number of fields or frames, with each field or frame including a number of slices of macroblocks. Each macroblock includes a number of blocks of pixels.

Except for the fact that decoder 114 is advantageously provided with hardware and/or software components adapted to be able to decode at least two slices of an encoded video in parallel, in part, video server 102, including encoder 112, and video receiver 104 represent a broad range of these elements known in the art or to be designed. Different embodiments may employ different implementations of these elements.

Further, video server 102 and video receiver 104 may be communicatively coupled to each other via any one of a number of wire based and/or wireless connections. For examples, the connection may be a bus connection (such as a Universal Serial Bus connection) or a wired local area network connection (such as an Ethernet connection). As a further example, the connection may also be a combined wireless and wired wide area network connection (such as a TMDA wireless connection between video sender 102 or video receiver 104 and a base station at one end, and a wire based ATM connection from the base station to the other end). [TDMA=Time Division Multiple Access, and ATM=Asynchronous Transfer Mode.]

Figure 2:
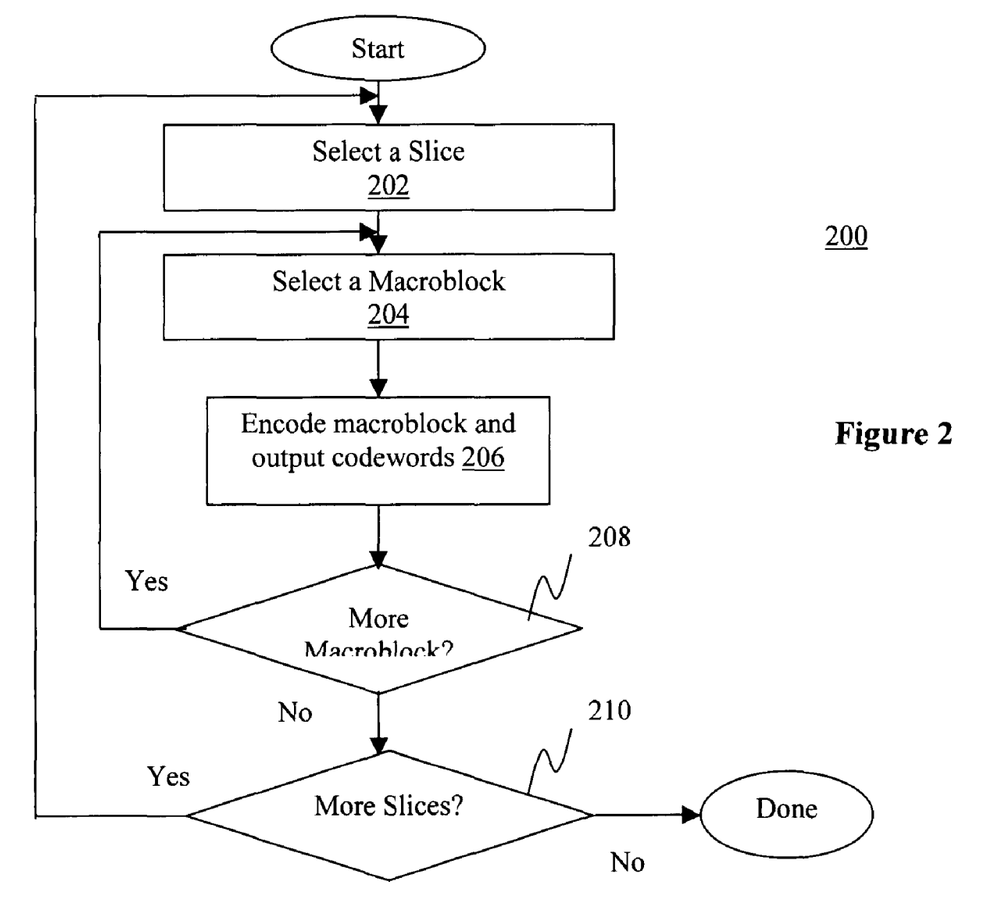
FIG. 2 illustrates the operational flow (logic) of the relevant aspects of the encoder block of FIG. 1 for encoding video, in accordance with one embodiment.

FIG. 2 illustrates the operational flow (logic) of the relevant aspects of the encoder of FIG. 1 for encoding a frame or a field, in accordance with one embodiment. For the embodiment, a video may be encoded on a frame by frame or field by field basis. In other words, for the embodiment, a video may be encoded by repeating encoding process 200 for each frame/field.

Figure 3:
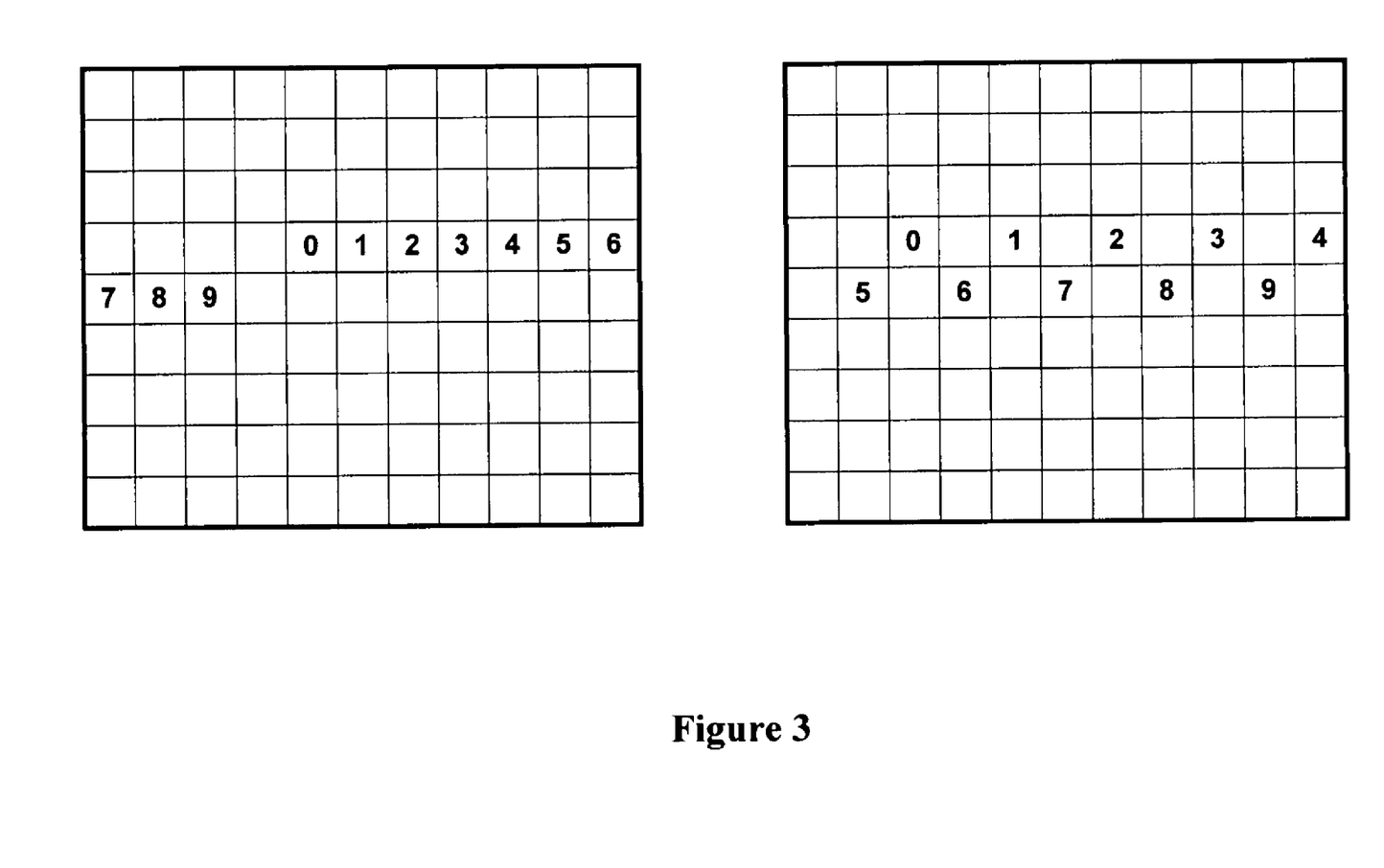
FIG. 3 illustrates two example assignments of macroblocks of a video to a slice.

As illustrated, for the embodiment, to encode a frame/field, encoder 112 first selects a slice of macroblocks of the frame/field, block 202. FIG. 3 illustrates two examples of macroblocks assignment to slices. As illustrated, the assignments need not be contiguous. However, for both examples, the assignments are in a raster scan order.

Referring back to FIG. 2, next, on selection of a slice, encoder 112 selects a macroblock of the slice to encode, 204. At block 206, encoder 112 encodes the selected macroblock of the slice.

In various embodiments, encoding may be dependent on the picture type, e.g. whether the selected macroblock of pixels are pixel members of a B picture, a P picture or an I picture. More specifically, the encoding may make forward or backward references to other frames/fields or may make no such references (referred to as intra coding). The encoding may involve motion compensation, transformation, and/or quantization. The encoding may involve encoding of a macroblock type, encoding of transform coefficients and so forth. The encoding may be predictive. The codeword table or tables employed for encoding may comprise variable length codewords. The variable length codeword tables may be adaptively employed, depending on the context, as defined e.g. by a number of adjacent boundary blocks of adjacent macroblocks. Accordingly, encoding of a slice may be in view of another slice.

On encoding the macroblock, encoder 112 outputs the codewords encoding the selected macroblock, also block 206. In various embodiments, encoder 112 also outputs a header for each slice providing various descriptive information about the slice. Further, encoder 112 may output a macroblock allocation map for each field/frame describing macroblock allocations for the field/frame.

Figure 4:
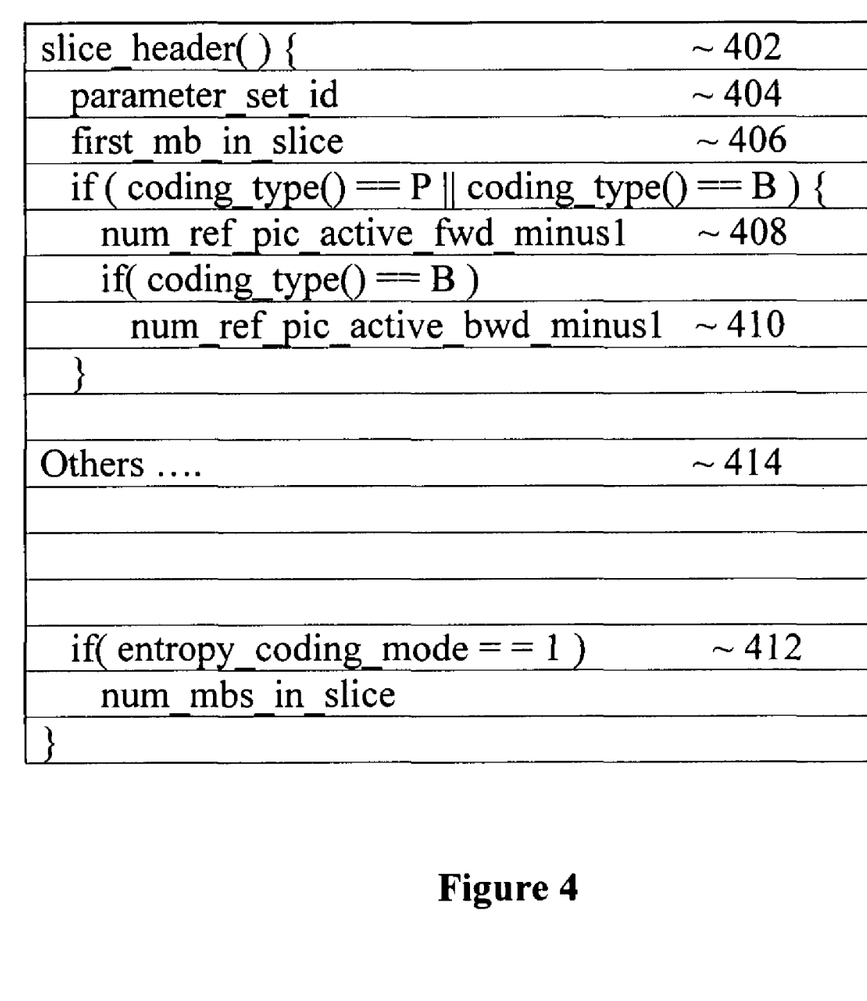
FIG. 4 illustrates an example slice header, in accordance with one embodiment.

FIG. 4 illustrates an example slice header for an outputted slice of encoded macroblocks. For the example header, slice header 402 includes slice synchronization code 403 identifying the starting location of a slice. Further, for the example header, slice header 402 includes a first identifier 404 identifying an encoding parameter set comprising one or more encoding parameters and a second identifier 406 identifying the first macroblock in the slice. Additionally, example slice header 402 includes a first value 408 indicating the number of forward referenced pictures 408, and a second value 410 indicating the number of backward referenced pictures 410. Further, example slice header may also include a third value 412 indicating the number of macroblocks in the slice 412 (for a particular entropy encoding mode). In other embodiments, example slice header 402 may include other parameters 414, and/or organized in other formats. In particular, slice header 402 may include explicit information describing a slice's decoding dependency on another slice.

Referring back to FIG. 2 again, after outputting the encoding codewords of the selected macroblock (along with any applicable supplemental information), encoder 112 determines if additional macroblocks of the slice remain to be encoded, block 208. If so, process 200 returns to block 204, and continues from there.

Otherwise, encoder 112 determines if additional slices of the frame/field remain to be encoded, block 210. If so, process 200 returns to block 202, and continues from there.

If all slices of the frame/field have been encoded, process 200 terminates.

Figure 5:
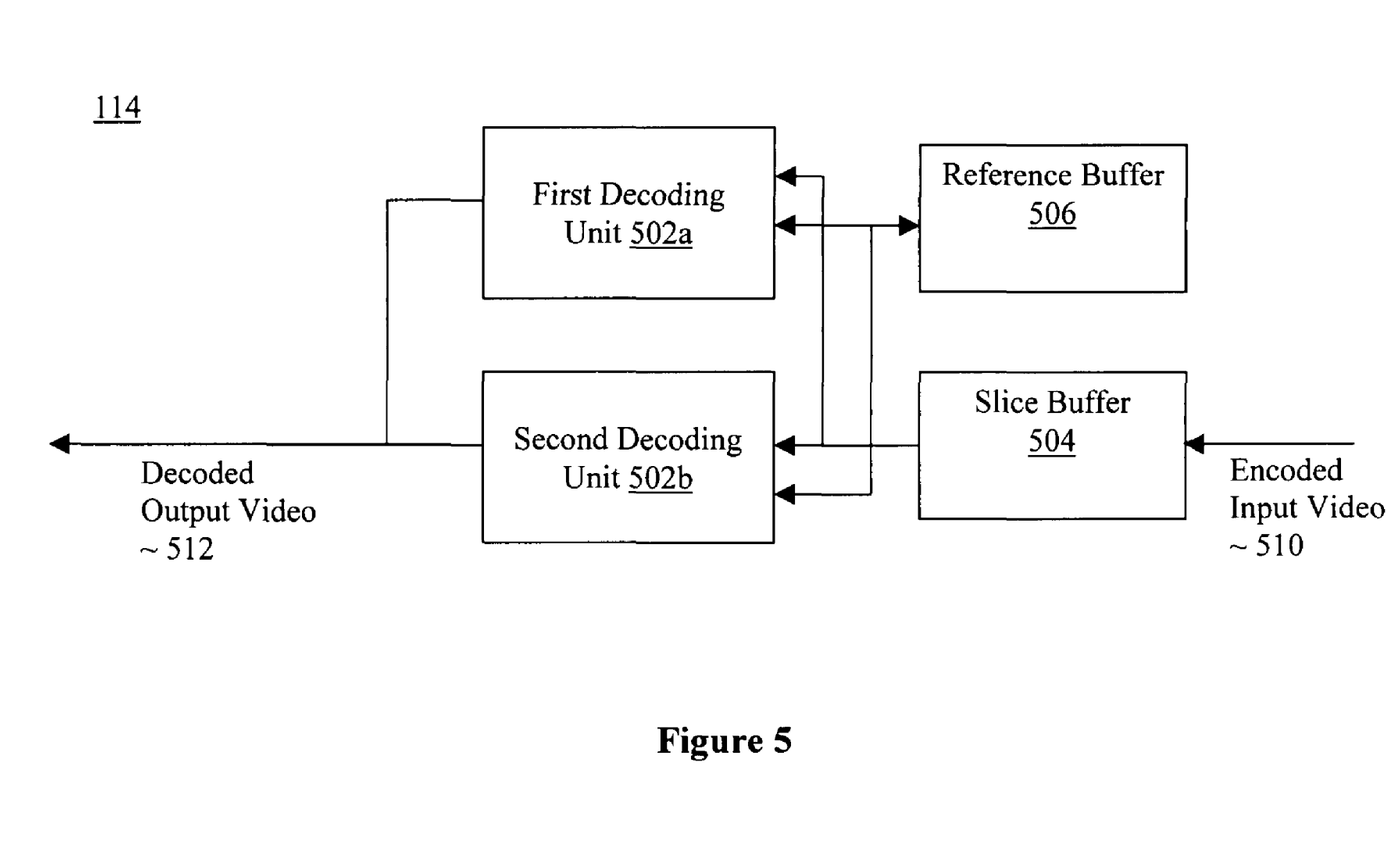
FIG. 5 illustrates the decoder of FIG. 1 in further details, in accordance with one embodiment.

FIG. 5 illustrates the decoder of FIG. 1 in further detail, in accordance with one embodiment. As illustrated, for the embodiment, decoder 114 includes two decoding units 502a-502b, slice buffer 504 and reference buffer 506, coupled to each other as shown.

Slice buffer 504 may be employed to stage successive subsets of the slices of an encoded video to be decoded, whereas reference buffer 506 may be employed to stage successive collections of relevant reference frames/fields for decoding the slices.

In various implementations, each of buffers 504 and 506 may be any one of a number of dedicated storage elements known in the art or to be designed, including but are not limited to FIFO (First-in-First-Out). In other implementations, each of buffers 504 and 506 may be an allocated area of any one of a number of shared storage elements known in the art or to be designed, including but are not limited to Dynamic Random Access Memory (DRAM) or Flash memory.

Continuing to refer to FIG. 5, for the embodiment, decoding units 502a and 502b are similarly constituted, with both equipped with the ability to decode slices of a video in parallel at least in part with the other decoding unit. While for ease of understanding, only two decoding units 502a-502b are illustrated, in alternate embodiments, decoder 114 may include more than two decoding units.

In some embodiments, decoding units 502a-502b may be hardware components, e.g. with their operational logic implemented via application specific integrated circuits (ASIC). In other embodiments, decoding units 502a-502b may be different parallel instantiations of a software component (execution threads, or simply, threads), implemented in one or more programming languages. In yet other embodiments, decoding units 502a-502b may be a hybrid hardware/software implementation.

Figure 6:
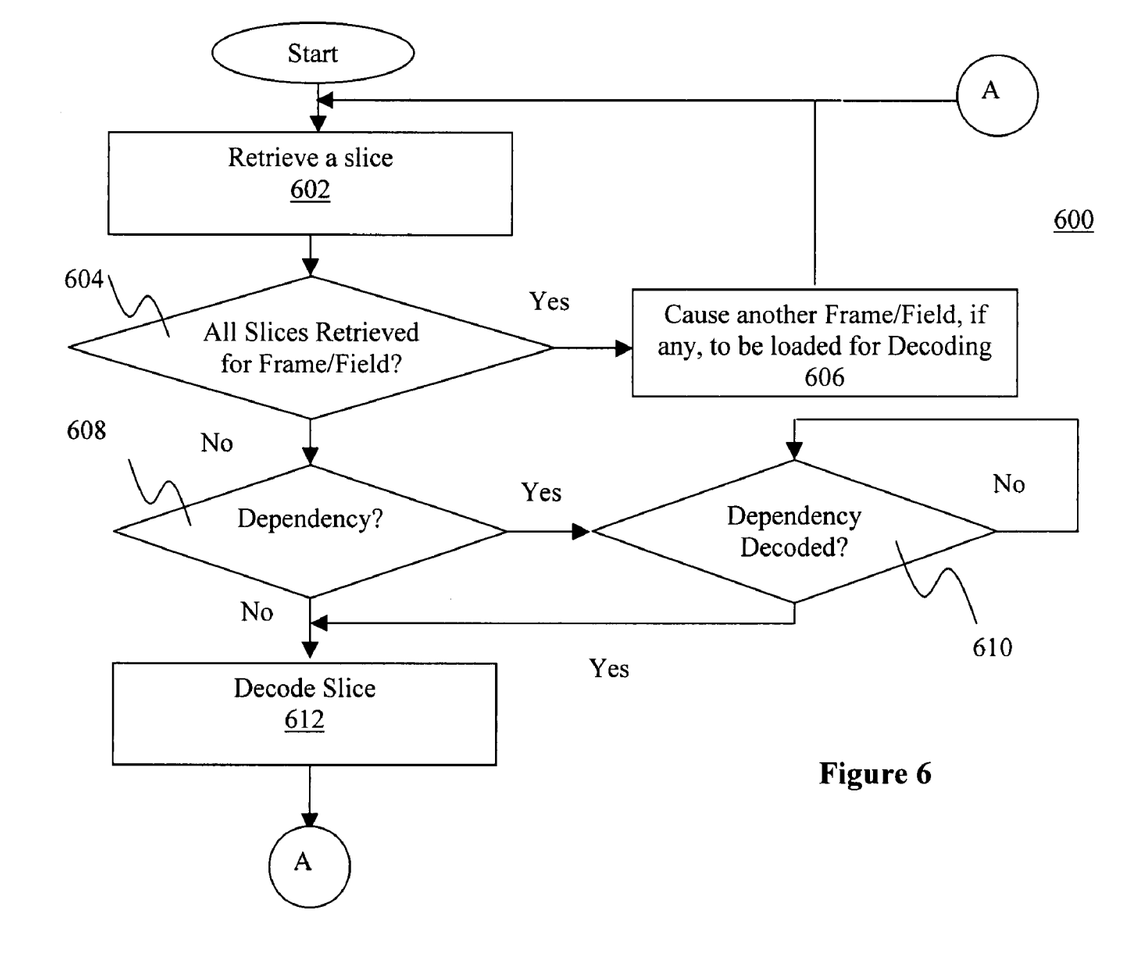
FIG. 6 illustrates the operational flow (logic) of the relevant aspects of one of the decoding units of FIG. 5, in accordance with one embodiment.

FIG. 6 illustrates the operational flow (logic) of the relevant aspects of the decoding unit of FIG. 5 for decoding a frame or a field, in accordance with one embodiment. The embodiment assumes an encoded video may be decoded on a frame by frame or field by field basis. However, in alternate embodiments, the operational flow may be modified accordingly, e.g. with additional tracking and saving of frame/field state, if the encoded video is to be decoded in a manner other than a frame by frame or field by field basis.

As illustrated for the embodiment, decoding unit 502\* (\* stands for any reference subscript) first attempts to retrieve a next slice from slice buffer 504 for decoding, block 602. In various embodiments, the retrieval may also include retrieval of supplemental data, such as a slice header, describing the slice to be decoded.

If all slices for the current frame/field have been decoded, block 604, decoder 114 causes slices of the next frame/field to be loaded, block 606. In various embodiments, decoding unit 502\* may also re-initiate all the frame/field specific decoding working data on causing a new frame/field to be loaded for decoding.

On the other hand, if slice buffer 504 is non-empty, and a slice of the current frame/field is retrieved, process 600 continues at block 608, where decoding unit 502\* determines if the retrieved slice has any decoding dependency yet to be resolved. If the retrieved slice is determined to have decoding dependency, process 600 continues at block 610, else process 600 continues at block 612.

In various embodiments, the determination of decoding dependency includes examining selected encodings of the macroblocks of the slice. In various embodiments, the examinations include examining encoding of the marcoblock type, whether predictive encoding and/or context adaptive encoding was employed. If so, the dependencies are inferred from the type of predictive encoding and/or context adaptive encoding employed.

In other embodiments where the dependency information is explicitly encoded in a slice's header, the determination may include examining the slice header of the retrieved slice.

If there are any decoding dependencies, decoding is delayed until decoding of the slices on which the retrieved slice is dependent have been completed. On the other hand, if there are no decoding dependencies, decoding commences immediately.

At block 610, decoding unit 502\* determines whether all the slices to which the retrieved slice depends have been decoded. If at least one of the slices to which the retrieved slice depends has not been decoded, decoding unit 502\* suspends itself for a period of time, or until signaled by a parallel execution unit that it has just completed the decoding of a slice. At the end of the suspension period, or when signaled, decoding unit 502\* checks again whether all the slices to which the retrieved slice depends have been decoded.

For the embodiment, the period of suspension is a predetermined amount of time, and the length of each subsequent suspension is reduced by another predetermined amount. In alternate embodiments, the length of each suspension may be constant or pseudo random.

In another embodiment, the period of suspension is determined by how long it takes for another decoding unit or thread to signal that it has completed the decoding of its work unit or slice.

Continuing to refer to FIG. 6, either initially or eventually determined that all the slices to which the retrieved slice depends have been decoded, process 600 continues at that point at block 612, where decoding unit 512\* decodes the retrieved slice.

For the embodiment, decoding unit 512\* is complementarily designed with respect to encoder 112. In other words, decoding of a slice complementarily includes decoding the codewords. Decoding of the slice may also complementarily include de-quantization, inverse transformation, motion compensation, and so forth, as appropriate.

Example Embodiments Including Decoder 114 of FIG. 1

Figure 7A:
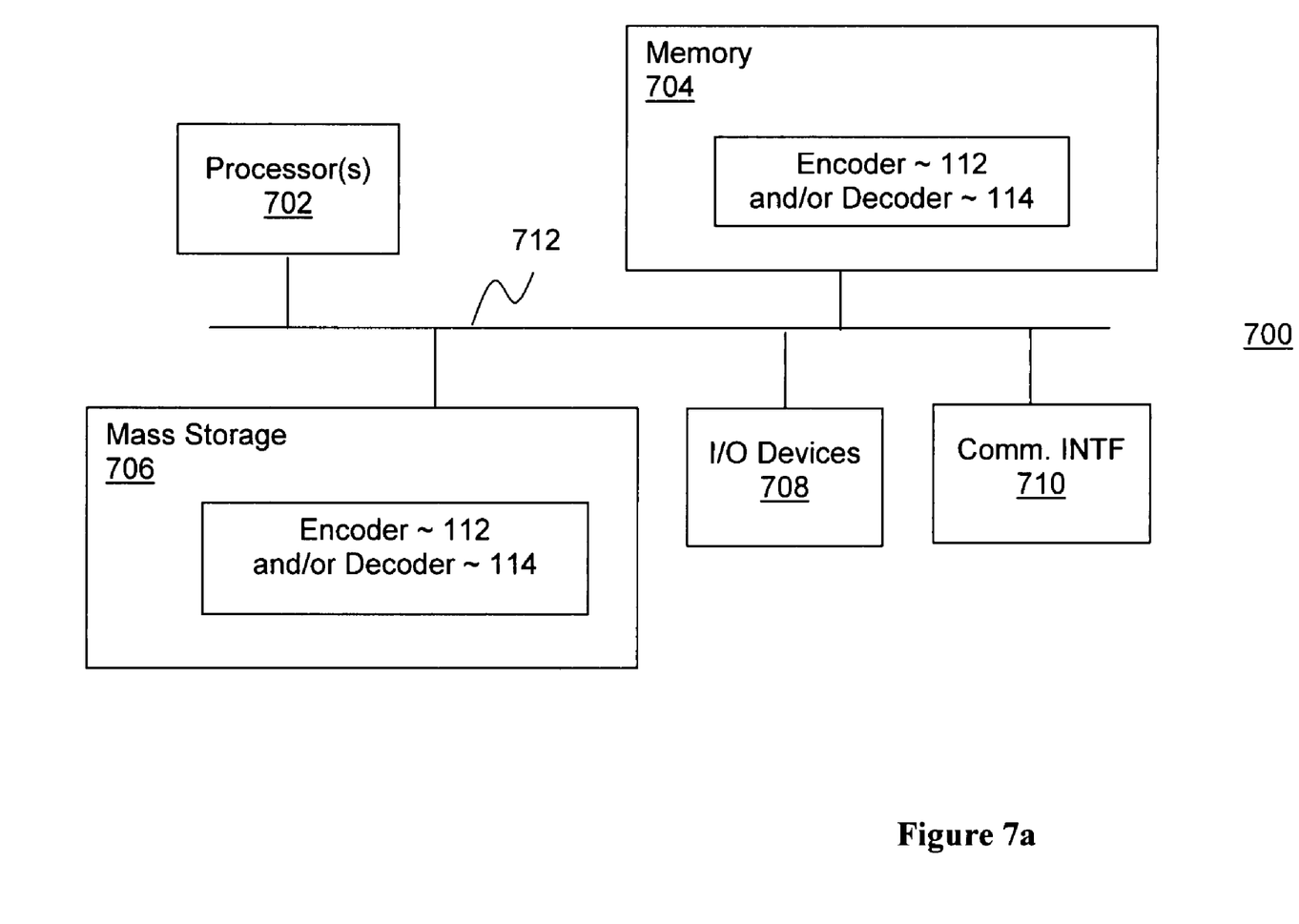
FIGS. 7a-7c illustrate various embodiments of the present invention.
Figure 7B:
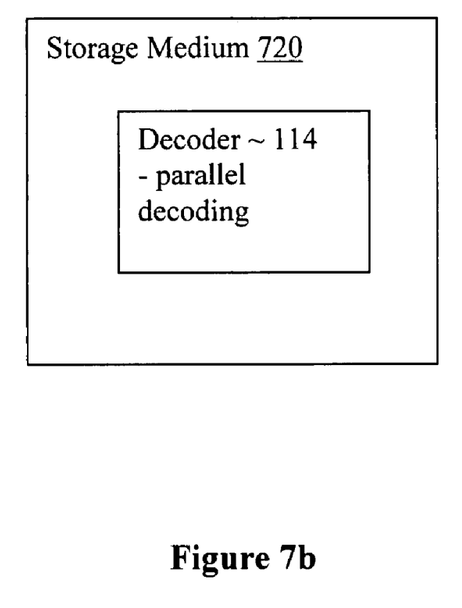
Figure 7C:
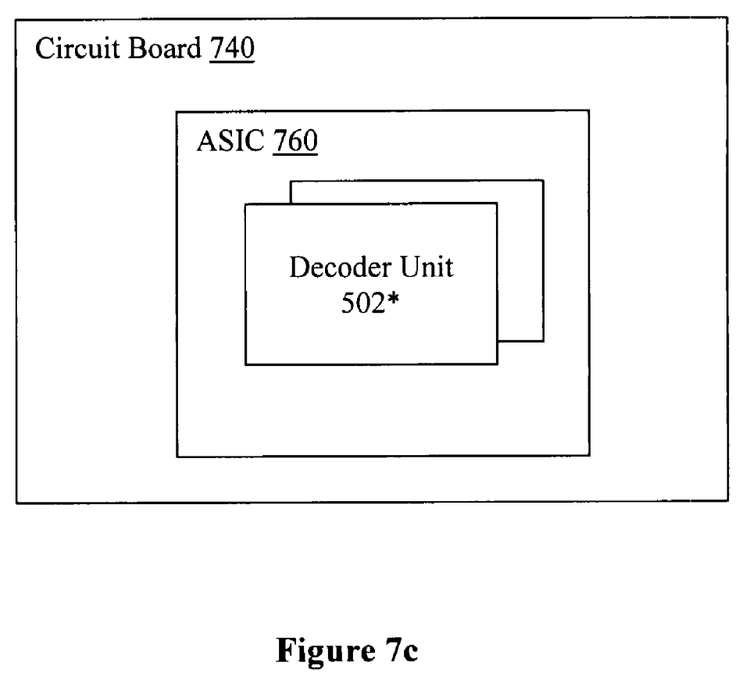

FIGS. 7*a*-7*c* illustrate various embodiments incorporated with decoder 114 of FIG. 1. More specifically, FIG. 7*a* illustrates an example digital system incorporated with a software implementation of decoder 114. For the embodiment, example digital system 700 includes processor 702, memory 704, mass storage 706, I/O devices 708, and communication interface 710 coupled to each other and bus 712 as shown.

Memory 704 and mass storage 706 may be employed store a working and a persistent copy of a software implementation of decoder 114. Except for its usage, memory 704 and mass storage 706 may respectively be any one of a number of storage elements known in the art or to be designed.

Processor 702, I/O devices 708, communication interface 710 and bus 712 represent a broad range of the respective elements known in the art or to be designed.

In various embodiments, digital system 700 may be a wireless mobile phone, a personal digital assistant, a palm-sized computing device, a laptop computing device, a tablet computing device, a desktop computing device, a set top box, a server, an entertainment unit, a DVD player, a digital camera, a television, a display monitor, and other computing devices of the like.

FIG. 7*b* illustrates an article of manufacture having storage medium 720 and a software implementation of decoder 114 stored therein. Stored decoder 114 may be employed to program and enable an apparatus to parallel decode encoded video as earlier described. The apparatus may e.g. be digital system 700 of FIG. 7*a*.

In various embodiments, article 720 may e.g. be a diskette, a compact disk (CD), a DVD (digital versatile disk) or other computer readable medium of the like. In other embodiments, article 720 may be a distribution server distributing encoder 112 and/or decoder 114 on line, via private and/or public networks, such as the Internet. In one embodiment, article 720 is a web server.

FIG. 7*c* illustrates a circuit board embodiment, where circuit board 740 includes an ASIC 760 having a number of hardware implementations of decoding unit 520\* incorporated therein. ASIC 760 may be employed to form e.g. a DVD player, a digital camera, an entertainment unit, a set-top box and so forth.

In alternate embodiments, the multiple decoding units 520\* may be disposed in multiple ASICs 760 instead.

CONCLUSION AND EPILOGUE

Thus, it can be seen from the above descriptions, a novel method for decoding video, including a decoder, devices and systems incorporated with the decoder have been described.

While the present invention has been described in terms of the foregoing embodiments and example applications, those skilled in the art will recognize that the invention is not limited to the embodiments and example application described. Alternate embodiments may be practiced with modification and alterations within the spirit and scope of the appended claims.

Thus, the description is to be regarded as illustrative instead of restrictive.

What is claimed is:

1. A computer-implemented method comprising:
   decoding, by the computer, a first slice of a first frame of a video by performing a submethod comprising:
      determining, in accordance with a slice header of the first slice, that the first slice has a decoding dependency on a second slice of a second frame of the video;
      determining that said second slice has not been decoded;
      suspending decoding the first slice for a first predetermined amount of time; then
      determining after said first predetermined amount of time that said second slice has not been decoded; then
      suspending decoding the first slice at least one subsequent time, wherein the length of each subsequent suspension of time is reduced by another predetermined amount; then
      determining that said second slice has been decoded; and
      transforming said first slice from an encoded state to a decoded state; and
   decoding, by the computer, said second slice;
   wherein said first and second slices each comprise a plurality of macroblocks that are respectively selected from said first and second frames of the video.

2. The method of claim 1, wherein the first and the second frame are the same frame.

3. A computer readable storage medium containing computer executable instructions that when executed by a processor, perform a method comprising:
   decode a first slice of a first frame of a video by performing a submethod comprising:
      determining, in accordance with a slice header of the first slice, that the first slice has a decoding dependency on a second slice;
      determining that said second slice has not been decoded;
      suspending decoding the first slice for a first predetermined amount of time; then
      determining after said first predetermined amount of time that said second slice has not been decoded; then
      suspending decoding the first slice at least one subsequent time, wherein the length of each subsequent suspension of time is reduced by another predetermined amount; then
      determining that said second slice has been decoded; and
      transforming said first slice from an encoded state to a decoded state;
   decode a second slice of a second frame of the video; and
   render said decoded first and second slices;
   wherein said first and second slices each comprise a plurality of macroblocks that are respectively selected from said first and second frames of the video.

4. An apparatus comprising:
   a buffer to store frames of a video;
   a first decoding unit coupled to the buffer to decode a first slice of a first frame of the video by performing a method comprising:
      determining, in accordance with a slice header of the first slice, that the first slice has a decoding dependency on a second slice;
      determining that said second slice has not been decoded;
      suspending decoding the first slice for a first predetermined amount of time; then
      determining after said first predetermined amount of time that said second slice has not been decoded; then
      suspending decoding the first slice at least one subsequent time, wherein the length of each subsequent suspension of time is reduced by another predetermined amount; then
      determining that said second slice has been decoded; and
      transforming said first slice from an encoded state to a decoded state; and
   a second decoding unit to decode a second slice of a second frame of the video;
   wherein said first and second slices each comprise a plurality of macroblocks that are respectively selected from said first and second frames of the video.

5. The apparatus of claim 4, wherein the apparatus is an ASIC comprising said first and second decoding units.

6. The apparatus of claim 4, wherein the apparatus is a circuit board comprising an ASIC having at least one of said first and second decoding units.

7. The apparatus of claim 6, wherein the apparatus is a selected one of a palm sized computing device, a wireless mobile phone, a digital personal assistant, a set-top box, a digital versatile disk player, a television, and a display monitor.

8. The apparatus of claim 4, wherein:
   the first and second decoding units comprise first and second threads of programming instructions designed to perform said first and second decoding respectively; and
   the apparatus further comprises one or more memory units to store the programming instructions, and at least one processor coupled to the one or more memory units to execute the first and second threads of programming instructions.

9. The apparatus of claim 8, wherein the apparatus is a selected one of a palm sized computing device, a wireless mobile phone, a digital personal assistant, a laptop computing device, a desktop computing device, a set-top box, a server, a digital versatile disk player, a television, and a display monitor.

10. A system comprising:
   a video provider to provide an encoded video; and
   a video renderer coupled to the video provider to receive the encoded video, decode the received video, and render the decoded video, including
   a first decoding unit to decode a first slice of a first frame of the video by performing a method comprising:
      determining, in accordance with a slice header of the first slice, that the first slice has a decoding dependency on a second slice;
      determining that said second slice has not been decoded;
      suspending decoding the first slice for a first predetermined amount of time; then
      determining after said first predetermined amount of time that said second slice has not been decoded; then
      suspending decoding the first slice at least one subsequent time, wherein the length of each subsequent suspension of time is reduced by another predetermined amount; then
      determining that said second slice has been decoded; and
      transforming said first slice from an encoded state to a decoded state, and
   a second decoding to decode a second slice of a second frame of the video;

wherein said first and second slices each comprise a plurality of macroblocks that are respectively selected from said first and second frames of the video.

11. The method of claim 1, wherein said plurality of macroblocks comprise a plurality of non-sequential macroblocks.

12. The computer readable storage medium of claim 3, wherein the first and the second frame are the same frame.

13. The computer readable storage medium of claim 3, wherein said plurality of macroblocks comprise a plurality of non-sequential macroblocks.

14. The apparatus of claim 4, wherein the first and the second frame are the same frame.

15. The apparatus of claim 4, wherein said plurality of macroblocks comprise a plurality of non-sequential macroblocks.

16. The method of claim 10, wherein the first and the second frame are the same frame.

17. The method of claim 10, wherein said plurality of macroblocks comprise a plurality of non-sequential macroblocks.

* * * * *

UNITED STATES PATENT AND TRADEMARK OFFICE
CERTIFICATE OF CORRECTION

PATENT NO. : 7,627,039 B2
APPLICATION NO. : 10/656537
DATED : December 1, 2009
INVENTOR(S) : Karl O. Lillevold It is certified that error appears in the above-identified patent and that said Letters Patent is hereby corrected as shown below:

Column 1, line 12 "other related technologies have also led to increase in on..." should be changed to --other related technologies have also led to an increase in on-...--.

Column 1, lines 65-67 "In the following description, various aspects of embodiments the present invention will be described. However, it will be apparent to those skilled in the art other embodiments..." should be changed to --In the following description, various aspects of embodiments of the present invention will be described. However, it will be apparent to those skilled in the art that other embodiments...--.

Column 6, line 18 "Memory 704 and mass storage 706 may be employed store..." should be changed to --Memory 704 and mass storage 706 may be employed to store...--.

Signed and Sealed this

Thirteenth Day of July, 2010

David J. Kappos
*Director of the United States Patent and Trademark Office*